Aug. 16, 1927.

A. J. HOLLINGSHEAD 1,639,037

AUTOMOBILE BODY CONSTRUCTION

Filed June 17, 1926   2 Sheets-Sheet 1

Inventor
A. J. Hollingshead
By
Attorney

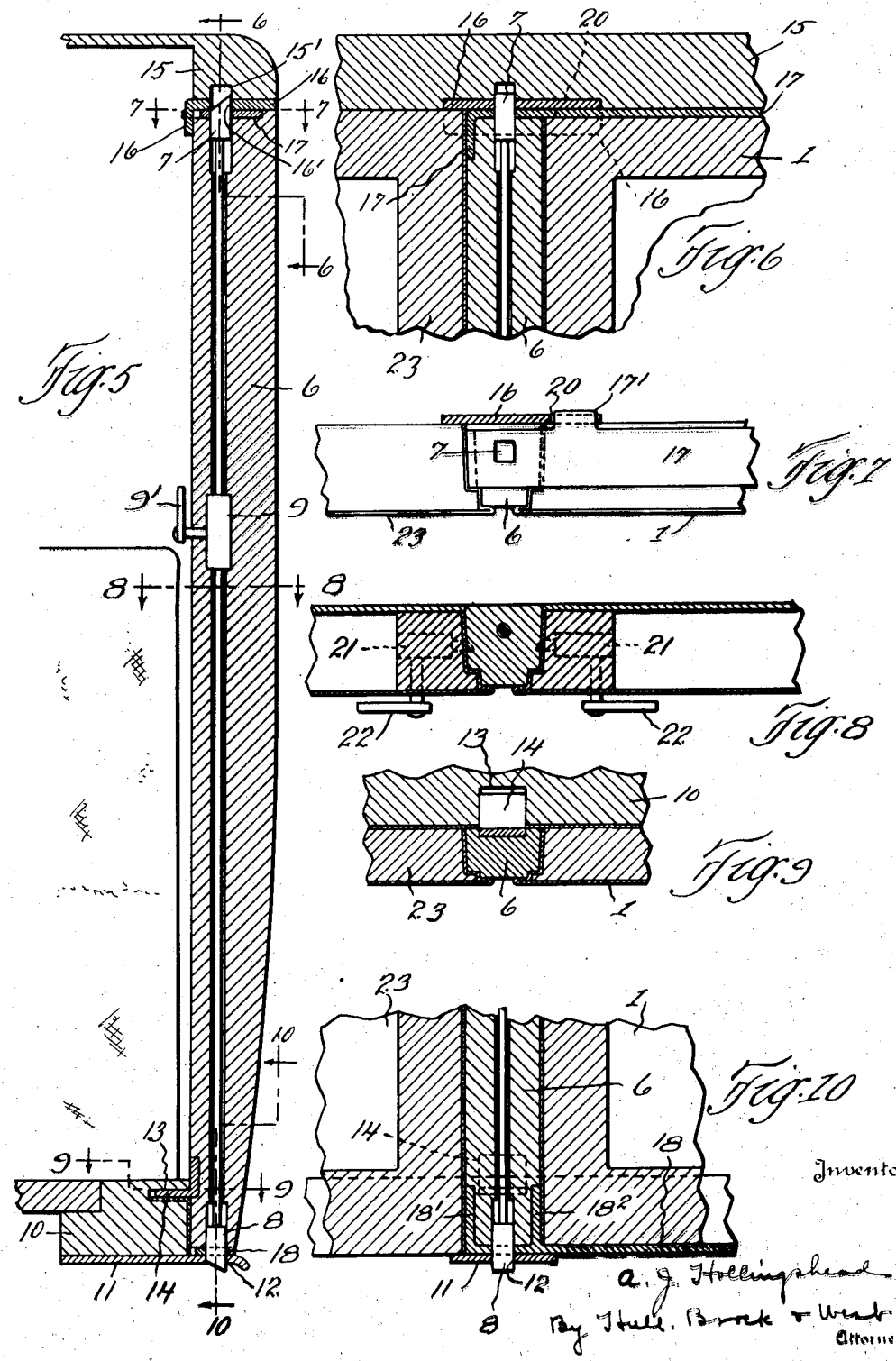

Patented Aug. 16, 1927.

1,639,037

UNITED STATES PATENT OFFICE.

ARTHUR J. HOLLINGSHEAD, OF NORTH OLMSTED, OHIO.

AUTOMOBILE BODY CONSTRUCTION.

Application filed June 17, 1926. Serial No. 116,542.

This invention relates to an automobile door construction for automobiles of the sedan type and the main object of the invention is to provide means for converting an automobile of the usual sedan construction into an ambulance or invalid car.

Another object of the invention is to provide a door construction for a sedan whereby all of the side of the car included between the front edge of the front door and the rear edge of the rear door may be opened up, without obstruction, so as to permit the insertion of an invalid cot.

Another object of the invention is to provide a center body pillar which may be detachably connected to the upper and lower sills of the body and to provide means for detachably securing the center body pillar to one of the doors, whereby the same may be swung as a unit along with one of the doors if desired.

A still further object of the invention is to provide a center body pillar construction of the class described which may be substituted for the usual center body pillar without materially changing the usual construction.

Figure 1:
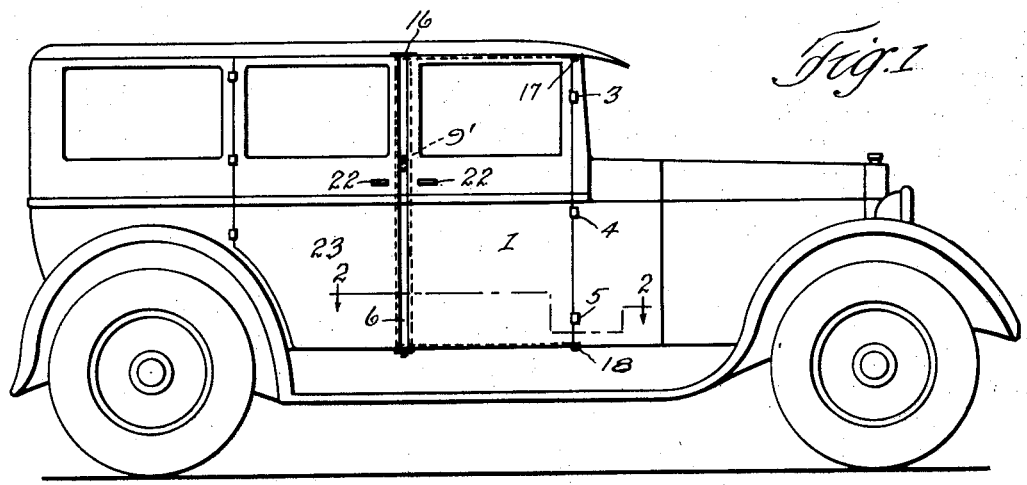
Figure 2:
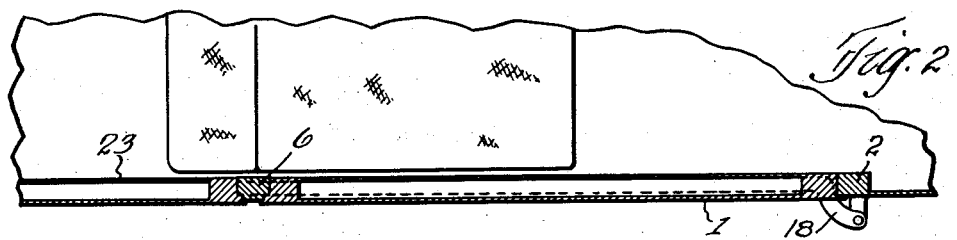
Figure 3:
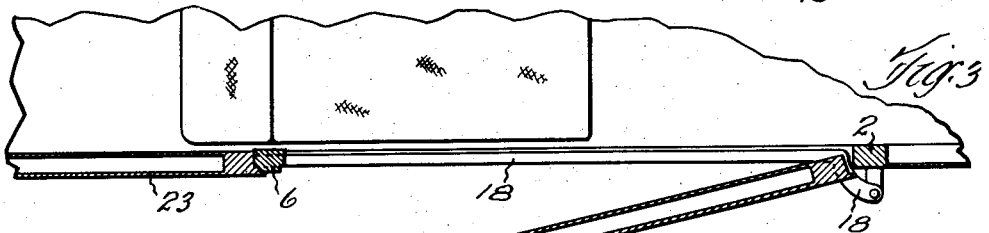
Figure 4:
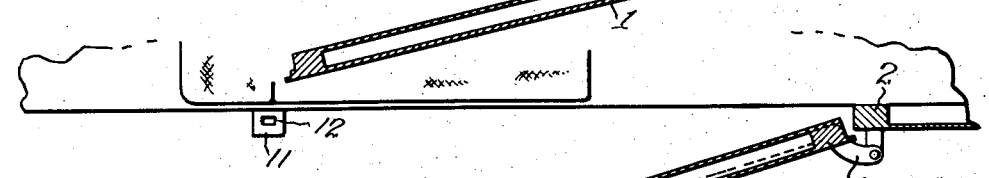

Further and more limited objects of my invention will appear as the description proceeds and by reference to the accompanying drawings in which Fig. 1 is a view in side elevation of a closed car provided with my improved door construction; Fig. 2 is a horizontal sectional view on the line 2—2 of Fig. 1; Fig. 3 is a view similar to Fig. 2 with the front door open; Fig. 4 is a view similar to Fig. 3 with both doors partly opened; Fig. 5 is a vertical sectional view of the central pillar and its associated parts;
Fig. 6 is a sectional view on the line 6—6 of Fig. 5; Fig. 7 is a horizontal sectional view on the line 7—7 of Fig. 5; Fig. 8 is a similar view on the line 8—8 of Fig. 5; Fig. 9 is a similar view on line 9—9 of Fig. 5 and Fig. 10 is a vertical sectional view on line 10—10 of Fig. 5.

Referring now to the drawings, the numeral 1 designates the right front door of an automobile of the sedan type which is hinged on the windshield body pillar 2 as shown at 3, 4 and 5. The numeral 6 designates the center body pillar against which both the front and rear doors close. The pillar 6 is detachably secured in place and is equipped with a lock 9 morticed into the pillar having spring urged bolts 7 and 8 which are adapted to be projected into suitable recesses in the top and bottom sills of the body, respectively. The lock is adapted to be opened by a lever or handle 9' positioned on the inside of the pillar adjacent the front seat. The bolts are normally spring urged into the locking position. Extending longitudinally of the chassis is a sill or beam 10 which serves to support and form a stop for the pillar 6. Secured to the bottom of sill 10 is an outwardly projecting flange 11 having an aperture 12 therein adapted to receive the bolt 8 therethrough. The sill 10 is also provided with a recess 13 adapted to receive therein an L-shaped member 14 which is secured to the pillar 6 adjacent its lower end, as shown in Fig. 5. The upper sill or beam 15 is provided with a recess 15' and secured to the sill 15 is an L-shaped flange 16 having an aperture 16' therein in alignment with the recess 15'. The flange 16 serves to limit the inward movement of the pillar 6 and the flange 11 serves to hold the pillar 6 against longitudinal displacement when both the doors are in closed position. The pillar 6 is also hingedly secured to the windshield body pillar by specially forged hinge pintles 17 and 18 made to fit the individual car on which this arrangement is desired. The hinge pintle 18 extends across the bottom of the door 1 and is provided with a pair of spaced parallel extending portions 18' and 18² which are morticed into the center pillar 6. The hinge pintle 18 is apertured as at 19 to allow the bolt 8 to be projected therethrough. The opposite end of the hinge pintle 18 is offset as shown so as to bring the same into proper alignment with the hinge members on the windshield pillar. The upper end of the center pillar is fastened to the body in the same manner as the lower end by means of a similar hinge pintle 17 and both the top and bottom of the doors are rabbeted out to make clearance for the application of these two hinge pintles. The upper hinge pintle 17 is also provided with an inwardly projecting portion 17' which fits into a recess 20 in flange 16, as shown most clearly in Figs. 6 and 7, and serves to hold the pillar 6 against longitudinal displacement.

It will also be clear that the center pillar 6 is further held against longitudinal displacement at its lower end by the flange 11 and the flange 14 engaging in recess 13 in the sill 10.

The door 1 is provided with the usual fastening means 21 operated by a handle 22. The automobile is also provided with the usual rear door which opens rearwardly and closes against the pillar 6 in the usual manner.

*Operation.*

When the sedan is used in the ordinary manner the door 1 is opened in the usual manner by means of the latch handle 22 leaving the center pillar 6 in position. When it is desired to swing the center body pillar 6 with the door 1, the handle 22 will not be operated leaving the door 1 latched to the body pillar; but the handle 9' will be operated to disengage the bolts 7 and 8 from their respective recesses. The door 1 and center body pillar 6 can then be swung as a unit about the hinge pivots 3, 4 and 5; and by opening the rear door the entire side of the car will be opened for the purpose of inserting an invalid cot. As soon as the handle 9 is released the springs will spring the bolts 7 and 8 apart and when the door 1 is closed the bolts will ride on suitable cam surfaces provided in advance of the seats for the bolts so that the end of bolts may snap into their seats when the door is closed.

It will now be clear that I have provided a device which will accomplish the objects of the invention as hereinbefore stated.

Having thus described my invention, what I claim is:—

1. A body construction for automobiles of the sedan type including a pair of doors opening in opposite directions, a center body pillar against which said doors close, said center body pillar being detachably connected with the body whereby the same may be swung as a unit along with one of the doors.

2. A body construction for automobiles of the sedan type including a pair of doors, a center body pillar against which said doors close, means for detachably securing said center pillar to the body construction and means for detachably securing said center pillar to one of said doors whereby the center pillar and door may be swung as a unit.

3. A body construction for automobiles of the sedan type having a pair of doors hinged thereto, a center body pillar against which said doors close, means for detachably securing said center pillar to the upper and lower sills of the body construction, said means comprising a pair of bolts adapted to be projected into recesses in said upper and lower sills, hinge pintles connected at one end to said center pillar and at their opposite ends to a part of the body construction so as to swing with one of said doors.

4. A body construction of the class described having a pair of doors, a center body pillar against which said doors close and latch, means for detachably securing said center pillar to said body construction, hinge members secured to said center pillar at one end and extending across the bottom and top of one of said doors and having their opposite ends secured to a part of the body construction so as to swing as a unit with one of said doors.

5. A device as set forth in claim 4 in which the top and bottom of one of said doors is rabbeted out to receive said hinge members.

6. A body construction for vehicles of the closed car type having a front door and a rear door opening in opposite directions, means detachably connected with the body construction and with one of the doors whereby all of the side of the car between the front edge of the front door and the rear edge of the rear door may be opened up without obstruction so as to permit the insertion of an invalid cot therein.

7. A body construction of the class described having a pair of doors hingedly secured thereto, said body construction having a bottom sill and a top sill, an outwardly projecting flange on the bottom sill and a downwardly projecting flange on the top sill, a center body pillar against which said doors close, means for detachably connecting said pillar to said top and bottom sills, a pair of hinge members having one end secured to said pillar and their opposite ends connected to a part of the body construction so as to swing as a unit with one of said doors, said outwardly projecting flange serving to support the weight of said pillar and said downwardly projecting flange and bottom sill serving to limit the inward movement of said center pillar.

8. In a body construction of the class described, a lower sill having a flange secured thereto and projecting outwardly therefrom, a top sill having a flange secured thereto and projecting downwardly therefrom, a center body pillar detachably secured between said top and bottom sills, said flange on the bottom sill serving to support the weight of said pillar and said bottom sill and flange on the top sill serving to limit the inward movement of said pillar.

9. A body construction of the class described comprising a bottom sill having a recess in the side face thereof and a flange thereon projecting outwardly substantially parallel to said recess, a top sill having a member secured thereto and projecting downwardly therefrom, a center body pillar adapted to be detachably secured to said sills, a flange on said pillar adjacent the lower end adapted to be projected into said recess when said pillar is secured in place.

10. In a body construction for automobiles of the sedan type having a pair of doors hingedly secured thereto, of a bottom sill, a flange secured to said bottom sill and projecting outwardly therefrom, said bottom sill having a recess in the side face thereof, a top sill, a flange secured to said top sill having a portion projecting downwardly therefrom, a center body pillar adapted to be detachably secured to said upper and lower sills, a flange adjacent the lower end of said pillar adapted to be projected into the recess in said bottom sill, said bottom sill and flange on the top sill serving to reinforce said pillar and to hold the same against lateral displacement.

11. A body construction for automobiles of the sedan type including a pair of doors, a center body pillar against which said doors close, means for detachably securing said center pillar to the body construction and means for securing said center pillar to one of said doors whereby the center pillar and door may be swung as a unit.

In testimony whereof, I hereunto affix my signature.

ARTHUR J. HOLLINGSHEAD.